US012567348B2

(12) United States Patent
Park et al.

(10) Patent No.: US 12,567,348 B2
(45) Date of Patent: Mar. 3, 2026

(54) METHOD OF INSPECTING DISPLAY PANEL AND DISPLAY DEVICE

(71) Applicant: Samsung Display Co., LTD., Yongin-si (KR)

(72) Inventors: Young Min Park, Yongin-si (KR); Young Keun Lee, Yongin-si (KR); A Ree Song, Yongin-si (KR); Jung A Choi, Yongin-si (KR); Hye Young Ha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/917,365

(22) Filed: Oct. 16, 2024

(65) Prior Publication Data

US 2025/0131862 A1 Apr. 24, 2025

(30) Foreign Application Priority Data

Oct. 23, 2023 (KR) ........................ 10-2023-0141727

(51) Int. Cl.
*G09G 3/00* (2006.01)
*G09G 3/3208* (2016.01)

(52) U.S. Cl.
CPC ........... *G09G 3/006* (2013.01); *G09G 3/3208* (2013.01); *G09G 2320/0233* (2013.01); *G09G 2330/12* (2013.01)

(58) Field of Classification Search
CPC ................. G09G 3/006; G09G 3/3208; G09G 2320/0233; G09G 2330/12
See application file for complete search history.

(56) References Cited

U.S. PATENT DOCUMENTS

| | | | | |
|---|---|---|---|---|
| 8,589,100 | B2 * | 11/2013 | Chaji | G09G 3/32 345/82 |
| 9,135,851 | B2 | 9/2015 | Rykowski | |
| 9,430,958 | B2 * | 8/2016 | Chaji | G09G 3/3258 |
| 9,773,441 | B2 * | 9/2017 | Chaji | G09G 3/3258 |
| 9,881,532 | B2 * | 1/2018 | Chaji | G09G 3/32 |
| 10,032,399 | B2 * | 7/2018 | Chaji | G09G 3/3258 |
| 10,176,736 | B2 * | 1/2019 | Chaji | G09G 3/32 |

(Continued)

FOREIGN PATENT DOCUMENTS

CN 110782829 A 2/2020

*Primary Examiner* — Gene W Lee

(74) *Attorney, Agent, or Firm* — Womble Bond Dickinson (US) LLP

(57) ABSTRACT

According to one or more embodiments, a method of inspecting a display device may include measuring first luminance of each of first pixels included in a first group and measuring first correction luminance of a correction pixel while the first group and the correction pixel are turned on, measuring second luminance of each of second pixels included in a second group and measuring second correction luminance of the correction pixel while the second group and the correction pixel are turned on, measuring third luminance of each of third pixels included in a third group and measuring third correction luminance of the correction pixel while the third group and the correction pixel are turned on, measuring fourth luminance of each of fourth pixels included in a fourth group and measuring fourth correction luminance of the correction pixel while the fourth group and the correction pixel are turned on.

20 Claims, 12 Drawing Sheets

(56) References Cited

U.S. PATENT DOCUMENTS

| | | | | |
|---|---|---|---|---|
| 10,395,574 | B2 * | 8/2019 | Chaji | G09G 3/006 |
| 10,783,814 | B2 * | 9/2020 | Chaji | G09G 3/3258 |
| 10,854,121 | B2 * | 12/2020 | Chaji | G09G 3/006 |
| 10,971,043 | B2 * | 4/2021 | Chaji | G09G 3/32 |
| 2022/0366822 | A1 * | 11/2022 | Leerentveld | G09G 3/3233 |
| 2023/0136688 | A1 * | 5/2023 | Leerentveld | G09G 3/3233 345/207 |

* cited by examiner

METHOD OF INSPECTING DISPLAY PANEL AND DISPLAY DEVICE

CROSS-REFERENCE TO RELATED APPLICATION

The present application claims priority to and the benefit of Korean Patent Application No. 10-2023-0141727, filed on Oct. 23, 2023, in the Korean Intellectual Property Office, the entire disclosure of which is incorporated by reference herein.

BACKGROUND

1. Field

The present disclosure relates to a method of inspecting a display panel and a display device.

2. Description of the Related Art

A wearable device that forms a focus at a short distance from a user's eyes is being developed in the form of glasses or a helmet. For example, the wearable device may be a head mounted display (HMD) device or augmented reality (AR) glasses. Such a wearable device provides an AR screen or a virtual reality (VR) screen to a user.

A wearable device such as an HMD device or AR glasses should generally have a display specification of at least 2000 pixels per inch (PPI) so that a user can use it for a long time without dizziness. To this end, organic light emitting diode (OLED) on silicon (OLEDoS) technology, which is a small high-resolution organic light emitting display device, is being proposed. OLEDoS is a technology for placing an organic light emitting diode (OLED) on a semiconductor wafer substrate on which a complementary metal oxide semiconductor (CMOS) is disposed.

A method of inspecting whether a display panel is defective includes short range uniformity (SRU) evaluation in which the luminance uniformity of pixels is evaluated by evaluating a narrow area of the screen displayed on the display panel. However, the SRU evaluation is not easy for display panels to which the OLEDoS technology has been applied because the display panel includes ultra-high resolution pixel.

SUMMARY

Aspects and features of embodiments of the present disclosure provide a method of inspecting a display panel and a display device, in which short range uniformity (SRU) evaluation for evaluating the luminance uniformity of pixels can be performed.

According to one or more embodiments of the present disclosure, a method of inspecting a display device may include measuring first luminance of each of first pixels included in a first group and measuring first correction luminance of a correction pixel while the first group from among a plurality of pixels included in a display panel and the correction pixel are turned on, measuring second luminance of each of second pixels included in a second group and measuring second correction luminance of the correction pixel while the second group from among the plurality of pixels and the correction pixel are turned on, measuring third luminance of each of third pixels included in a third group and measuring third correction luminance of the correction pixel while the third group from among the plurality of pixels and the correction pixel are turned on, measuring fourth luminance of each of fourth pixels included in a fourth group and measuring fourth correction luminance of the correction pixel while the fourth group from among the plurality of pixels and the correction pixel are turned on, determining average correction luminance by calculating an average of the first through fourth correction luminances, calculating first through fourth converted luminances by dividing each of the first through fourth luminances by the average correction luminance, and determining whether the display panel is defective based on dispersion of the first through fourth converted luminances from an average value of luminance.

The first pixels included in the first group from among the plurality of pixels are pixels located in a first row and first column from among 2*2 pixels located adjacent to each other, the second pixels included in the second group from among the plurality of pixels are pixels located in the first row and a second column from among the 2*2 pixels located adjacent to each other, the third pixels included in the third group from among the plurality of pixels are pixels located in a second row and the first column from among the 2*2 pixels located adjacent to each other, and the fourth pixels included in the fourth group from among the plurality of pixels are pixels located in the second row and the second column from among the 2*2 pixels located adjacent to each other.

While the first group and the correction pixel are turned on, the pixels of the second through fourth groups may remain turned off.

While the second group and the correction pixel are turned on, the pixels of the first group, the third group, and the fourth group may remain turned off.

While the third group and the correction pixel are turned on, the pixels of the first group, the second group, and the fourth group may remain turned off.

While the fourth group and the correction pixel are turned on, the pixels of the first through third groups may remain turned off.

The correction pixel may be on a periphery of the display panel.

The correction pixel may include a plurality of correction pixels adjacent to each other.

The method may further include constantly turning on the correction pixels while the pixels of the first through fourth groups are sequentially turned on.

The method may further include determining that the display panel is defective if the dispersion deviates from the average value of luminance by about 2%.

According to one or more embodiments of the present disclosure a method of inspecting a display panel may include measuring first luminance of each of first pixels included in a first group and measuring first correction luminance of a correction pixel while the first group from among a plurality of pixels included in the display panel and the correction pixel are turned on, measuring second luminance of each of second pixels included in a second group and measuring second correction luminance of the correction pixel while the second group from among the plurality of pixels and the correction pixel are turned on, measuring third luminance of each of third pixels included in a third group and measuring third correction luminance of the correction pixel while the third group from among the plurality of pixels and the correction pixel are turned on, measuring fourth luminance of each of fourth pixels included in a fourth group and measuring fourth correction luminance of the correction pixel while the fourth group from among the plurality of pixels and the correction pixel are turned on, determining average correction luminance by calculating an average of the first through fourth correction luminances, calculating first through fourth converted luminances by dividing each of the first through fourth luminances by the average correction luminance, and determining whether the display panel is defective based on dispersion of the first through fourth converted luminances from an average value of luminance.

The first pixels included in the first group from among the plurality of pixels are pixels in a first row and a first column from among 2*2 pixels located adjacent to each other, the second pixels included in the second group from among the plurality of pixels are pixels in the first row and a second column from among the 2*2 pixels located adjacent to each other, the third pixels included in the third group from among the pixels are pixels in a second row and the first column from among the 2*2 pixels located adjacent to each other, and the fourth pixels included in the fourth group from among the pixels are pixels in the second row and the second column from among the 2*2 pixels located adjacent to each other.

While the first group and the correction pixel are turned on, the pixels of the second through fourth groups may remain turned off.

While the second group and the correction pixel are turned on, the pixels of the first group, the third group, and the fourth group may remain turned off.

While the third group and the correction pixel are turned on, the pixels of the first group, the second group, and the fourth group may remain turned off.

While the fourth group and the correction pixel are turned on, the pixels of the first through third groups may remain turned off.

The correction pixel is on a periphery of the display panel.

The correction pixel may include a plurality of correction pixels adjacent to each other.

The method may further include constantly turning on the correction pixels while the pixels of the first through fourth groups are sequentially turned on.

The method may further include determining that the display panel is defective if the dispersion deviates from the average value of luminance by about 2%.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

These and/or other aspects and features of embodiments of the present disclosure will become apparent and more readily appreciated from the following description of the embodiments, taken in conjunction with the accompanying drawings in which.

DETAILED DESCRIPTION

The present disclosure will now be described more fully hereinafter with reference to the accompanying drawings, in which embodiments of the present disclosure are shown. The present disclosure may, however, be embodied in different forms and should not be construed as limited to the embodiments set forth herein. Rather, these embodiments are provided so that the present disclosure will be thorough and complete, and will fully convey the scope of the present disclosure to those skilled in the art.

It will also be understood that when a layer is referred to as being "on" another layer or substrate, it can be directly on the other layer or substrate, or intervening layers may also be present. The same reference numbers indicate the same components throughout the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings and scope of the present disclosure. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

Hereinafter, specific embodiments will be described with reference to the accompanying drawings.

Figure 1:
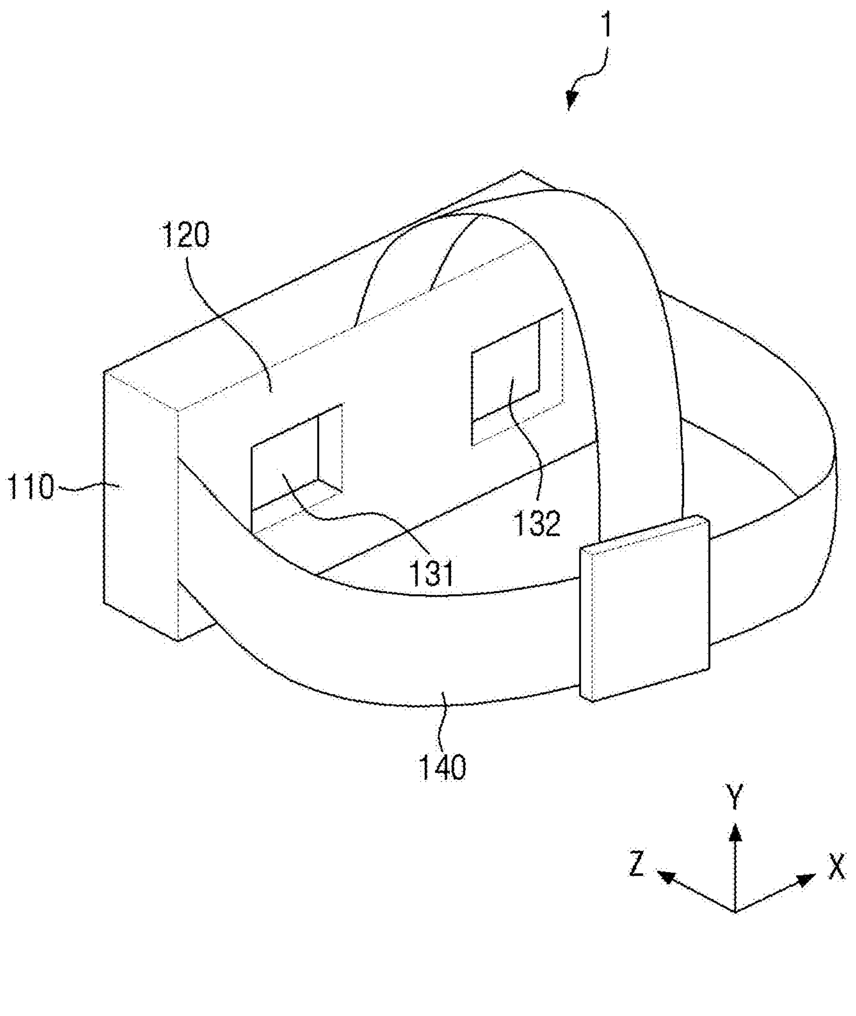
FIG. 1 is a perspective view of a head mounted display device according to one or more embodiments.
Figure 2:
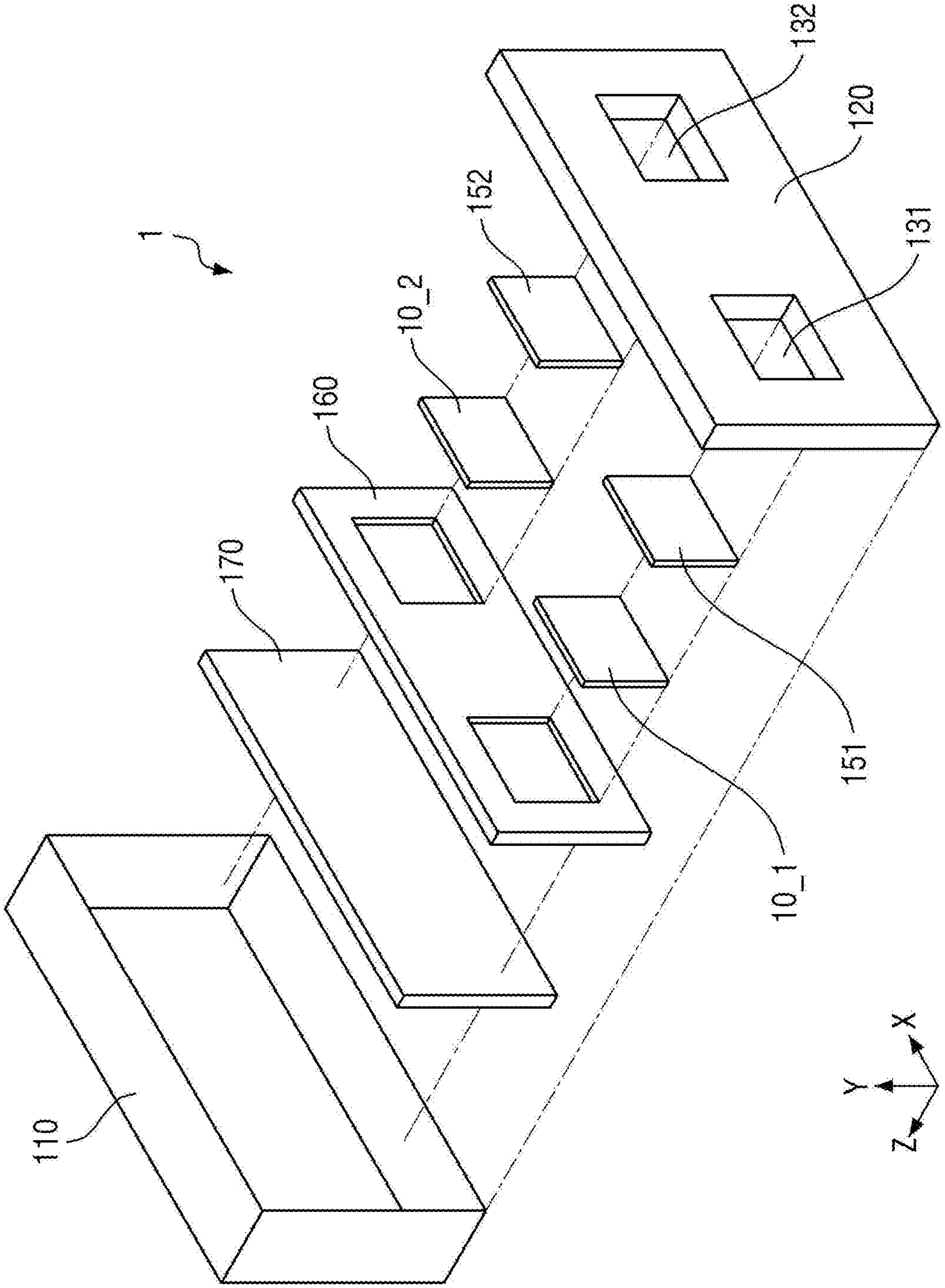
FIG. 2 is an exploded perspective view of an example of the head mounted display device of FIG. 1.

FIG. 1 is a perspective view of a head mounted display device 1 according to one or more embodiments. FIG. 2 is an exploded perspective view of an example of the head mounted display device 1 of FIG. 1.

Referring to FIGS. 1 and 2, the head mounted display device 1 according to one or more embodiments includes a first display device 10_1, a second display device 10_2, a display device housing 110, a housing cover 120, a first eyepiece 131, a second eyepiece 132, a head mounted band 140, a middle frame 160, a first optical member 151, a second optical member 152, a control circuit board 170, and a connector.

The first display device 10_1 provides an image to a user's left eye, and the second display device 10_2 provides an image to the user's right eye. Each of the first display device 10_1 and the second display device 10_2 is substantially the same as a display device 10 to be described with reference to FIGS. 4 and 5. Therefore, a description of the first display device 10_1 and the second display device 10_2 will be replaced with descriptions given with reference to FIGS. 4 and 5.

The first optical member 151 may be disposed between the first display device 10_1 and the first eyepiece 131. The second optical member 152 may be disposed between the second display device 10_2 and the second eyepiece 132. Each of the first optical member 151 and the second optical member 152 may include at least one convex lens.

The middle frame 160 may be disposed between the first display device 10_1 and the control circuit board 170 and may be disposed between the second display device 10_2 and the control circuit board 170. The middle frame 160 supports and fixes the first display device 10_1, the second display device 10_2, and the control circuit board 170.

The control circuit board 170 may be disposed between the middle frame 160 and the display device housing 110. The control circuit board 170 may be connected to the first display device 10_1 and the second display device 10_2 through the connector. The control circuit board 170 may convert an image source received from the outside into digital video data DATA and transmit the digital video data DATA to the first display device 10_1 and the second display device 10_2 through the connector.

The control circuit board 170 may transmit the digital video data DATA corresponding to a left image optimized for a user's left eye to the first display device 10_1 and transmit the digital video data DATA corresponding to a right image optimized for the user's right eye to the second display device 10_2. Alternatively, the control circuit board 170 may transmit the same digital video data DATA to the first display device 10_1 and the second display device 10_2.

The display device housing 110 houses the first display device 10_1, the second display device 10_2, the middle frame 160, the first optical member 151, the second optical member 152, the control circuit board 170, and the connector. The housing cover 120 is placed to cover an open surface of the display device housing 110. The housing cover 120 may include the first eyepiece 131 on which a user's left eye is placed and the second eyepiece 132 on which the user's right eye is placed. Although the first eyepiece 131 and the second eyepiece 132 are disposed separately in FIGS. 1 and 2, the present disclosure is not limited thereto. The first eyepiece 131 and the second eyepiece 132 may also be combined into one.

The first eyepiece 131 may be aligned with the first display device 10_1 and the first optical member 151, and the second eyepiece 132 may be aligned with the second display device 10_2 and the second optical member 152. Therefore, a user can view an image of the first display device 10_1, which is enlarged as a virtual image by the first optical member 151, through the first eyepiece 131 and can view an image of the second display device 102, which is enlarged as a virtual image by the second optical member 152, through the second eyepiece 132.

The head mounted band 140 fixes the display device housing 110 to a user's head so that the first eyepiece 131 and the second eyepiece 132 of the housing cover 120 are kept placed on the user's left and right eyes, respectively. When the display device housing 120 is implemented to be lightweight and small, the head mounted display device 1 may include an eyeglass frame as illustrated in FIG. 3 instead of the head mounted band 140.

In addition, the head mounted display device 1 may further include a battery for supplying power, an external memory slot for accommodating an external memory, and an external connection port and a wireless communication module for receiving an image source. The external connection port may be a universal serial bus (USB) terminal, a display port, or a high-definition multimedia interface (HDMI) terminal, and the wireless communication module may be a 5G communication module, a 4G communication module, a Wi-Fi module, and/or a Bluetooth module.

Figure 3:
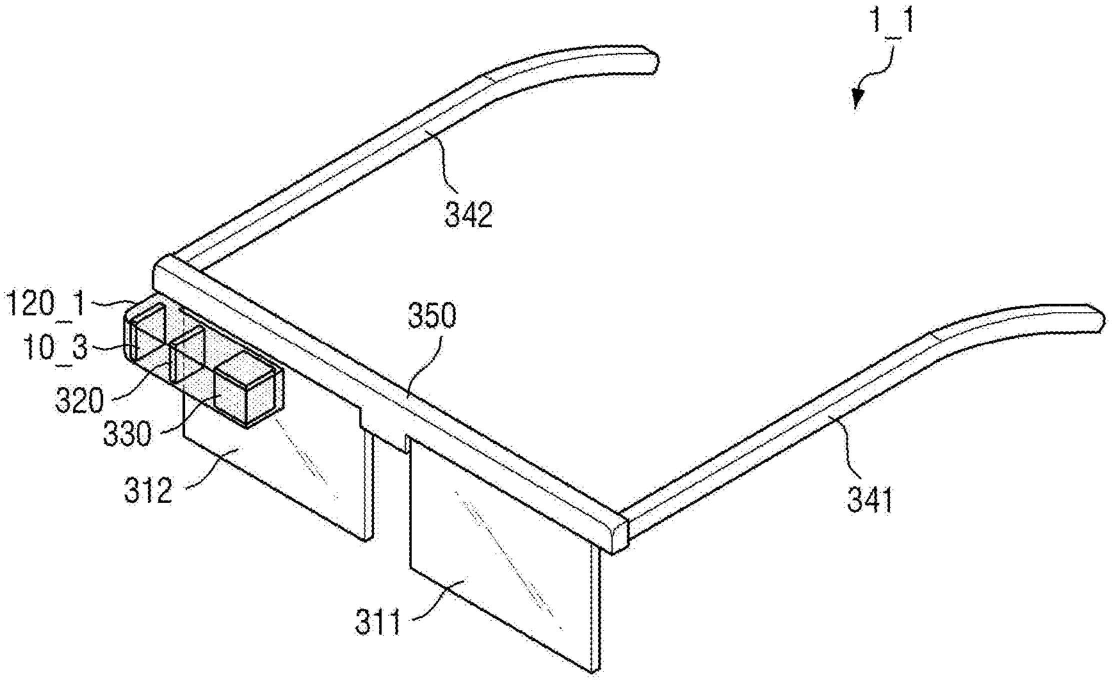
FIG. 3 is a perspective view of a head mounted display device according to one or more embodiments.

FIG. 3 is a perspective view of a head mounted display device 1_1 according to one or more embodiments.

Referring to FIG. 3, the head mounted display device 1_1 according to the embodiment may be a display device in the form of glasses in which a display device housing 120_1 is implemented to be lightweight and small. The head mounted display device 1_1 according to the embodiment may include a display device 10_3, a left lens 311, a right lens 312, a support frame 350, eyeglass frame legs 341 and 342, an optical member 320, an optical path conversion member 330, and the display device housing 120_1.

The display device 10_3 illustrated in FIG. 3 is substantially the same as the display device 10 to be described with reference to FIGS. 4 and 5. Therefore, a description of the display device 10_3 will be replaced with the descriptions given with reference to FIGS. 4 and 5.

The display device housing 120_1 may include the display device 10_3, the optical member 320, and the optical path conversion member 330. An image displayed on the display device 10_3 may be enlarged by the optical member 320, may have its optical path converted by the optical path conversion member 330, and then may be provided to a user's right eye through the right lens 312. Accordingly, the user can view, through the right eye, an augmented reality image into which a virtual image displayed on the display device 10_3 and a real image viewed through the right lens 312 are combined.

Although the display device housing 120_1 is disposed at a right end of the support frame 350 in FIG. 3, the present disclosure is not limited thereto. For example, the display device housing 120_1 may also be disposed at a left end of the support frame 350. In this case, an image of the display device 10_3 may be provided to a user's left eye. Alternatively, the display device housing 1201 may be disposed at both the left and right ends of the support frame 350. In this case, the user can view an image displayed on the display device 103 through both the left and right eyes.

Figure 4:
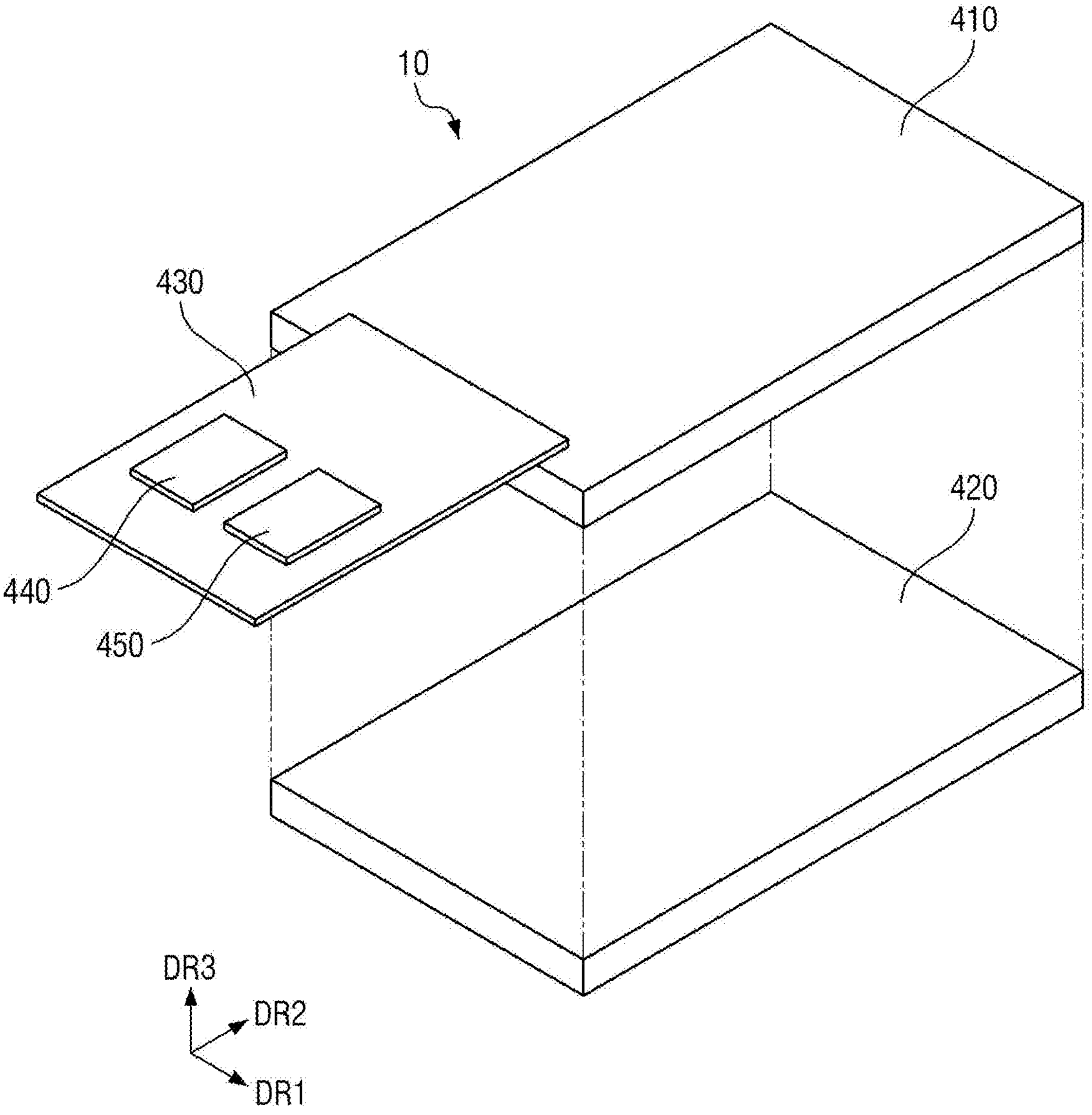
FIG. 4 is an exploded perspective view of a display device according to one or more embodiments.

FIG. 4 is an exploded perspective view of a display device 10 according to one or more embodiments.

Referring to FIG. 4, the display device 10 according to the embodiment is a device for displaying moving images and/or still images. The display device 10 according to the embodiment may be applied to portable electronic devices such as mobile phones, smartphones, tablet personal computers (PCs), mobile communication terminals, electronic notebooks, electronic books, portable multimedia players (PMPs), navigation devices, and ultra-mobile PCs (UMPCs). For example, the display device 10 may be applied as a display unit of a television, a notebook computer, a monitor, a billboard, and/or an Internet of things (IoT) device. Alternatively, the display device 10 may be applied to smart watches, watch phones, and head mounted displays for implementing virtual reality and/or augmented reality.

The display device 10 according to the embodiment includes a display panel 410, a heat dissipation layer 420, a circuit board 430, a driving circuit 440, and a power supply circuit 450.

The display panel 410 may have a planar shape similar to a quadrangle. For example, the display panel 410 may have a planar shape similar to a quadrangle having short sides in a first direction DR1 and long sides in a second direction DR2 intersecting the first direction DR1. In the display panel 410, each corner where a short side extending in the first direction DR1 meets a long side extending in the second direction DR2 may be rounded with a desired curvature (e.g., a predetermined curvature) or may be right-angled. The planar shape of the display panel 410 is not limited to a quadrangular shape and may also be similar to other polygonal shapes, a circular shape, or an oval shape. The planar shape of the display device 10 may follow the planar shape of the display panel 410, but the present disclosure is not limited thereto.

The display panel 410 includes a display area that displays an image and a non-display area that does not display an image.

Figure 5:
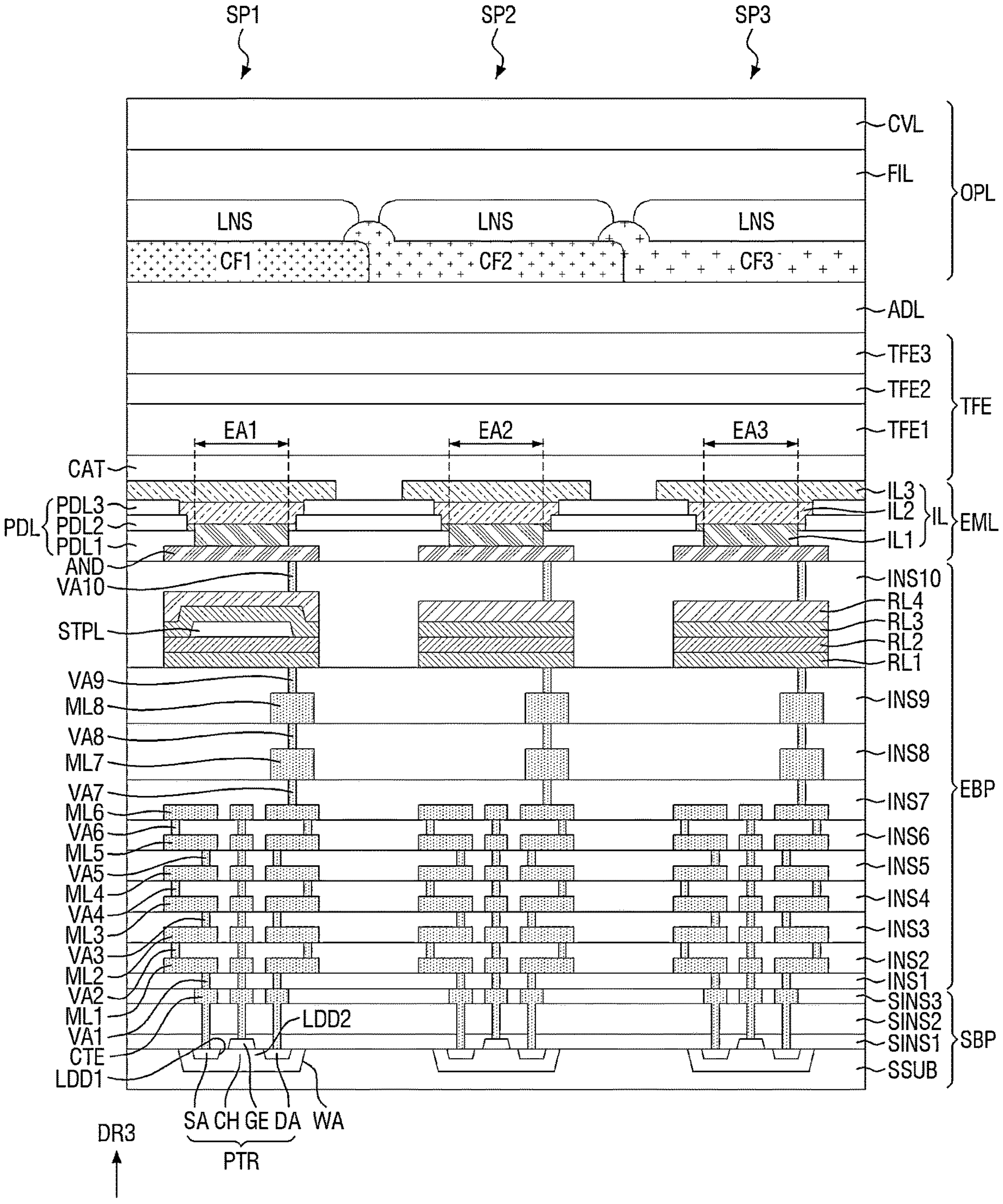
FIG. 5 is a cross-sectional view of an example of a part of a display panel according to one or more embodiments.

The display area includes a plurality of pixels, and each of the pixels includes a plurality of subpixels SP1 through SP3 (see FIG. 5). The subpixels SP1 through SP3 include a plurality of pixel transistors. The pixel transistors may be formed through a semiconductor process and may be disposed on a semiconductor substrate SSUB (see FIG. 5). For example, the pixel transistors may be formed as complementary metal oxide semiconductors (CMOS).

The heat dissipation layer 420 may overlap the display panel 410 in a third direction DR3 which is a thickness direction of the display panel 410. The heat dissipation layer 420 may be disposed on a surface, e.g., a back surface of the display panel 410. The heat dissipation layer 420 dissipates heat generated from the display panel 410. The heat dissipation layer 420 may include a metal layer having high thermal conductivity, such as graphite, silver (Ag), copper (Cu), and/or aluminum (Al).

The circuit board 430 may be electrically connected to a plurality of pads in a pad area of the display panel 410 by using a conductive adhesive member such as an anisotropic conductive film. The circuit board 430 may be a flexible printed circuit board made of a flexible material or may be a flexible film. Although the circuit board 430 is unfolded in FIG. 4, it may also be bent. In this case, one end of the circuit board 430 may be placed on the back surface of the display panel 410. The end of the circuit board 430 may be an end opposite the other end of the circuit board 430 which is connected to the pads in the pad area of the display panel 410 by using the conductive adhesive member.

The driving circuit 440 may receive digital video data and timing signals from the outside. The driving circuit 440 may generate a scan timing control signal, an emission timing control signal, and a data timing control signal for controlling the display panel 410 according to the timing signals.

The power supply circuit 450 may generate a plurality of panel driving voltages according to a power supply voltage received from the outside.

Each of the driving circuit 440 and the power supply circuit 450 may be formed as an integrated circuit and attached to a surface of the circuit board 430.

FIG. 5 is a cross-sectional view of an example of a part of a display panel 410 according to one or more embodiments. For example, FIG. 5 illustrates a partial cross-sectional structure of a display area including a plurality of subpixels SP1 through SP3.

Referring to FIG. 5, the display panel 410 includes a semiconductor backplane SBP, a light emitting element backplane EBP, a light emitting element layer EML, an encapsulation layer TFE, an optical layer OPL, a cover layer CVL, and a polarizer.

The semiconductor backplane SBP includes a semiconductor substrate SSUB including a plurality of pixel transistors PTR, a plurality of semiconductor insulating layers covering the pixel transistors PTR, and a plurality of contact terminals CTE electrically connected to the pixel transistors PTR.

The semiconductor substrate SSUB may be a silicon substrate, a germanium substrate, and/or a silicon-germanium substrate. The semiconductor substrate SSUB may be a substrate doped with first-type impurities. A plurality of well areas WA may be disposed on an upper surface of the semiconductor substrate SSUB. The well areas WA may be areas doped with second-type impurities. The second-type impurities may be different from the first-type impurities. For example, when the first-type impurities are p-type impurities, the second-type impurities may be n-type impurities. Alternatively, when the first-type impurities are n-type impurities, the second-type impurities may be p-type impurities.

Each of the well areas WA includes a source area SA corresponding to a source electrode of a pixel transistor PTR, a drain area DA corresponding to a drain electrode of a pixel transistor PTR, and a channel area CH disposed between the source area SA and the drain area DA.

Each of the source area SA and the drain area DA may be an area doped with the first-type impurities. A gate electrode GE of each pixel transistor PTR may overlap a well area WA in the third direction DR3. The channel area CH may overlap the gate electrode GE in the third direction DR3. The source area SA may be disposed on one side of the gate electrode GE, and the drain area SA may be disposed on the other side of the gate electrode GE.

Each of the well areas WA further includes a first lightly doped impurity area LDD1 disposed between the channel area CH and the source area SA and a second lightly doped impurity area LDD2 disposed between the channel area CH and the drain area DA. The first lightly doped impurity area LDD1 may be an area having a lower impurity concentration than the source area SA. The second lightly doped impurity area LDD2 may be an area having a lower impurity concentration than the drain area DA. A distance between the source area SA and the drain area DA may be increased by the first lightly doped impurity area LDD1 and the second lightly doped impurity area LDD2. Accordingly, a length of the channel area CH of each pixel transistor PTR may increase, thereby preventing or reducing punch-through and hot carrier phenomena caused by a short channel.

A first semiconductor insulating layer SINS1 may be disposed on the semiconductor substrate SSUB. The first semiconductor insulating layer SINS1 may be a silicon carbon nitride (SiCN) and/or silicon oxide (SiOx)-based inorganic layer, but the present disclosure is not limited thereto.

A second semiconductor insulating layer SINS2 may be disposed on the first semiconductor insulating layer SINS1. The second semiconductor insulating layer SINS2 may be a silicon oxide (SiOx)-based inorganic layer, but the present disclosure is not limited thereto.

The contact terminals CTE may be disposed on the second semiconductor insulating layer SINS2. Each of the contact terminals CTE may be connected to any one of the gate electrode GE, the source area SA, and the drain area DA of a pixel transistor PTR through a hole penetrating the first semiconductor insulating layer SINS1 and the second semiconductor insulating layer SINS2. The contact terminals CTE may be made of one of copper (Cu), aluminum (Al), tungsten (W), molybdenum (Mo), chromium (Cr), gold (Au), titanium (Ti), nickel (Ni), and/or neodymium (Nd) and/or may be made of an alloy including any one of the same.

A third semiconductor insulating layer SINS3 may be disposed on side surfaces of each of the contact terminals CTE on the second semiconductor insulating layer SINS2. An upper surface of each of the contact terminals CTE may be exposed without being covered by the third semiconductor insulating layer SINS3. The third semiconductor insulating layer SINS3 may be a silicon oxide (SiOx)-based inorganic layer, but the present disclosure is not limited thereto.

The semiconductor substrate SSUB can be replaced with a glass substrate or a polymer resin substrate such as polyimide. In this case, thin-film transistors may be disposed on the glass substrate or the polymer resin substrate. The glass substrate may be a rigid substrate that is not bent, and the polymer resin substrate may be a flexible substrate that can be bent or curved.

The light emitting element backplane EBP includes first through eighth metal layers ML1 through ML8, reflective electrodes RL1 through RL4, a plurality of vias VA1 through VA10, and a step layer STPL. In addition, the light emitting element backplane EBP includes a plurality of interlayer insulating layers INS1 through INS10 disposed between the first through eighth metal layers ML1 through ML8.

The first through eighth metal layers ML1 through ML8 serve to implement the circuit of a subpixel (e.g., a first subpixel SP1) by connecting the contact terminals CTE exposed in the semiconductor backplane SBP.

A first interlayer insulating layer INS1 may be disposed on the semiconductor backplane SBP. First vias VA1 may penetrate the first interlayer insulating layer INS1 and may be respectively connected to the contact terminals CTE exposed in the semiconductor backplane SBP. The first metal layers ML1 may be disposed on the first interlayer insulating layer INS1 and may be connected to the first vias VA1, respectively.

A second interlayer insulating layer INS2 may be disposed on the first interlayer insulating layer INS1 and the first metal layers ML1. Second vias VA2 may penetrate the second interlayer insulating layer INS2 and may be connected to the exposed first metal layers ML1, respectively. The second metal layers ML2 may be disposed on the second interlayer insulating layer INS2 and may be connected to the second vias VA2, respectively.

A third interlayer insulating layer INS3 may be disposed on the second interlayer insulating layer INS2 and the second metal layers ML2. Third vias VA3 may penetrate the third interlayer insulating layer INS3 and may be connected to the exposed second metal layers ML2, respectively. The third metal layers ML3 may be disposed on the third interlayer insulating layer INS3 and may be connected to the third vias VA3, respectively.

A fourth interlayer insulating layer INS4 may be disposed on the third interlayer insulating layer INS3 and the third metal layers ML3. Fourth vias VA4 may penetrate the fourth interlayer insulating layer INS4 and may be connected to the exposed third metal layers ML3, respectively. The fourth metal layers ML4 may be disposed on the fourth interlayer insulating layer INS4 and may be connected to the fourth vias VA4, respectively.

A fifth interlayer insulating layer INS5 may be disposed on the fourth interlayer insulating layer INS4 and the fourth metal layers ML4. Fifth vias VA5 may penetrate the fifth interlayer insulating layer INS5 and may be connected to the exposed fourth metal layers ML4, respectively. The fifth metal layers ML5 may be disposed on the fifth interlayer insulating layer INS5 and may be connected to the fifth vias VA5, respectively.

A sixth interlayer insulating layer INS6 may be disposed on the fifth interlayer insulating layer INS5 and the fifth metal layers ML5. Sixth vias VA6 may penetrate the sixth interlayer insulating layer INS6 and may be connected to the exposed fifth metal layers ML5, respectively. The sixth metal layers ML6 may be disposed on the sixth interlayer insulating layer INS6 and may be connected to the sixth vias VA6, respectively.

A seventh interlayer insulating layer INS7 may be disposed on the sixth interlayer insulating layer INS6 and the sixth metal layers ML6. Seventh vias VA7 may penetrate the seventh interlayer insulating layer INS7 and may be connected to the exposed sixth metal layers ML6, respectively. The seventh metal layers ML7 may be disposed on the seventh interlayer insulating layer INS7 and may be connected to the seventh vias VA7, respectively.

An eighth interlayer insulating layer INS8 may be disposed on the seventh interlayer insulating layer INS7 and the seventh metal layers ML7. Eighth vias VA8 may penetrate the eighth interlayer insulating layer INS8 and may be connected to the exposed seventh metal layers ML7, respectively. The eighth metal layers ML8 may be disposed on the eighth interlayer insulating layer INS8 and may be connected to the eighth vias VA8, respectively.

The first through eighth metal layers ML1 through ML8 and the first through eighth vias VA1 through VA8 may be made of substantially the same material. The first through eighth metal layers ML1 through ML8 and the first through eighth vias VA1 through VA8 may be made of one of copper (Cu), aluminum (Al), tungsten (W), molybdenum (Mo), chromium (Cr), gold (Au), titanium (Ti), nickel (Ni), and/or neodymium (Nd) and/or may be made of an alloy including any one of the same. The first through eighth vias VA1 through VA8 may be made of substantially the same material. Each of the first through eighth interlayer insulating layers INS1 through INS8 may be a silicon oxide (SiOx)-based inorganic layer, but the present disclosure is not limited thereto.

A thickness of the first metal layers ML1, a thickness of the second metal layers ML2, a thickness of the third metal layers ML3, a thickness of the fourth metal layers ML4, a thickness of the fifth metal layers ML5, and a thickness of the sixth metal layers ML6 may each be greater than a thickness of the first vias VA1, a thickness of the second vias VA2, a thickness of the third vias VA3, a thickness of the fourth vias VA4, a thickness of the fifth vias VA5, and a thickness of the sixth vias VA6. The thickness of the second metal layers ML2, the thickness of the third metal layers ML3, the thickness of the fourth metal layers ML4, the thickness of the fifth metal layers ML5, and the thickness of the sixth metal layers ML6 may each be greater than (or equal to) the thickness of the first metal layers ML1. The thickness of the second metal layers ML2, the thickness of the third metal layers ML3, the thickness of the fourth metal layers ML4, the thickness of the fifth metal layers ML5, and the thickness of the sixth metal layers ML6 may be substantially the same.

A thickness of the seventh metal layers ML7 and a thickness of the eighth metal layers ML8 may each be greater than the thickness of the first metal layers ML1, the thickness of the second metal layers ML2, the thickness of the third metal layers ML3, the thickness of the fourth metal layers ML4, the thickness of the fifth metal layers ML5, and the thickness of the sixth metal layer ML6. The thickness of the seventh metal layers ML7 and the thickness of the eighth metal layers ML8 may each be greater than a thickness of the seventh vias VA7 and a thickness of the eighth vias VA8. The thickness of the seventh vias VA7 and the thickness of the eighth vias VA8 may each be greater than the thickness of the first vias VA1, the thickness of the second vias VA2, the thickness of the third vias VA3, the thickness of the fourth vias VA4, the thickness of the fifth vias VA5, and the thickness of the sixth vias VA6. The thickness of the seventh metal layers ML7 and the thickness of the eighth metal layers ML8 may be substantially the same.

A ninth interlayer insulating layer INS9 may be disposed on the eighth interlayer insulating layer INS8 and the eighth metal layers ML8. The ninth interlayer insulating layer INS9 may be a silicon oxide (SiOx)-based inorganic layer, but the present disclosure is not limited thereto.

Ninth vias VA9 may penetrate the ninth interlayer insulating layer INS9 and may be connected to the exposed eighth metal layers ML8, respectively. The ninth vias VA9 may be made of one of copper (Cu), aluminum (Al), tungsten (W), molybdenum (Mo), chromium (Cr), gold (Au), titanium (Ti), nickel (Ni), and/or neodymium (Nd) and/or may be made of an alloy including any one of the same.

First reflective electrodes RL1 may be disposed on the ninth interlayer insulating layer INS9 and may be connected to the ninth vias VA9, respectively. The first reflective electrodes RL1 may be made of one of copper (Cu), aluminum (Al), tungsten (W), molybdenum (Mo), chromium (Cr), gold (Au), titanium (Ti), nickel (Ni), and/or neodymium (Nd) and/or may be made of an alloy including any one of the same.

Second reflective electrodes RL2 may be disposed on the first reflective electrodes RL1, respectively. The second reflective electrodes RL2 may be made of one of copper (Cu), aluminum (Al), tungsten (W), molybdenum (Mo), chromium (Cr), gold (Au), titanium (Ti), nickel (Ni), and neodymium (Nd), and/or may be made of an alloy including any one of the same. For example, the second reflective electrodes RL2 may be titanium nitride (TiN).

In the first subpixel SP1, the step layer STPL may be disposed on a second reflective electrode RL2. The step layer STPL may not be disposed in a second subpixel SP2 and a third subpixel SP3. A thickness of the step layer STPL may be set in consideration of the wavelength of light of a first color and a distance from the light emitting layer EML to a fourth reflective electrode RL4 so as to facilitate the reflection of the light of the first color emitted from the light emitting layer EML of the first subpixel SP1. The step layer STPL may be a silicon carbon nitride (SiCN) and/or silicon oxide (SiOx)-based inorganic layer, but the present disclosure is not limited thereto.

In the first subpixel SP1, a third reflective electrode RL3 may be disposed on the second reflective electrode RL2 and the step layer STPL. In each of the second subpixel SP2 and the third subpixel SP3, the third reflective electrode RL3 may be disposed on the second reflective electrode RL2. The third reflective electrodes RL3 may be made of one of copper (Cu), aluminum (Al), tungsten (W), molybdenum (Mo), chromium (Cr), gold (Au), titanium (Ti), nickel (Ni), and/or neodymium (Nd), and/or may be made of an alloy including any one of the same.

At least one of the first through third reflective electrodes RL1 through RL3 may be omitted.

Fourth reflective electrodes RL4 may be disposed on the third reflective electrodes RL3, respectively. The fourth reflective electrodes RL4 may be layers that reflect light from the light emitting layer EML. The fourth reflective electrodes RL4 may include a metal having high reflectivity to facilitate the reflection of light. The fourth reflective electrodes RL4 may be made of aluminum (Al), a stacked structure (Ti/Al/Ti) of aluminum and titanium, a stacked structure (ITO/Al/ITO) of aluminum and indium tin oxide, an APC alloy which is an alloy of silver (Ag), palladium (Pd) and copper (Cu), and/or a stacked structure (ITO/APC/ITO) of an APC alloy and indium tin oxide, but the present disclosure is not limited thereto.

A tenth interlayer insulating layer INS10 may be disposed on the ninth interlayer insulating layer INS9 and the fourth reflective electrodes RL4. The tenth interlayer insulating layer INS10 may be a silicon oxide (SiOx)-based inorganic layer, but the present disclosure is not limited thereto.

Tenth vias VA10 may penetrate the tenth interlayer insulating layer INS10 and may be connected to the exposed fourth reflective electrodes RL4. The tenth vias VA10 may be made of one of copper (Cu), aluminum (Al), tungsten (W), molybdenum (Mo), chromium (Cr), gold (Au), titanium (Ti), nickel (Ni), and/or neodymium (Nd), and/or may be made of an alloy including any one of the same. Due to the step layer STPL, a thickness of a tenth via VA10 in the first subpixel SP1 may be smaller than a thickness of a tenth via VA10 in each of the second subpixel SP2 and the third subpixel SP3.

The light emitting element layer EML may be disposed on the light emitting element backplane EBP. The light emitting element layer EML may include light emitting elements LE, each including a first electrode AND, an intermediate layer IL and a second electrode CAT, and a pixel defining layer PDL.

The first electrode AND of each of the light emitting elements LE may be disposed on the tenth interlayer insulating layer INS10 and may be connected to a tenth via VA10. The first electrode AND of each of the light emitting elements LE may be connected to the drain area DA or the source area SA of a pixel transistor PTR through a tenth via VA10, the first through fourth reflective electrodes RL1 through RL4, the first through ninth vias VA1 through VA9, the first through eighth metal layers ML1 through ML8, and a contact terminal CTE. The first electrode AND of each of the light emitting elements LE may be made of one of copper (Cu), aluminum (Al), tungsten (W), molybdenum (Mo), chromium (Cr), gold (Au), titanium (Ti), nickel (Ni), and/or neodymium (Nd), and/or may be made of an alloy including one of the same. For example, the first electrode AND of each of the light emitting elements LE may be titanium nitride (TiN).

The pixel defining layer PDL may be disposed on a portion of the first electrode AND of each of the light emitting elements LE. The pixel defining layer PDL may cover edges of the first electrode AND of each of the light emitting elements LE. The pixel defining layer PDL defines first through third emission areas EA1 through EA3.

The first emission area EA1 may be defined as an area in the first subpixel SP1 where the first electrode AND, the intermediate layer IL, and the second electrode CAT are sequentially stacked to emit light. The second emission area EA2 may be defined as an area in the second subpixel SP2 where the first electrode AND, the intermediate layer IL, and the second electrode CAT are sequentially stacked to emit light. The third emission area EA3 may be defined as an area in the third subpixel SP3 where the first electrode AND, the intermediate layer IL, and the second electrode CAT are sequentially stacked to emit light.

The pixel defining layer PDL may include first through third pixel defining layers PDL1 through PDL3. The first pixel defining layer PDL1 may be disposed on the edges of the first electrode AND of each of the light emitting elements LE, the second pixel defining layer PDL2 may be disposed on the first pixel defining layer PDL1, and the third pixel defining layer PDL3 may be disposed on the second pixel defining layer PDL2. Each of the first pixel defining layer PDL1, the second pixel defining layer PDL2, and the third pixel defining layer PDL3 may be a silicon oxide (SiOx)-based inorganic layer, but the present disclosure is not limited thereto.

The intermediate layer IL may include a first intermediate layer IL1, a second intermediate layer IL2, and a third intermediate layer IL3.

The intermediate layer IL may have a tandem structure including a plurality of intermediate layers IL1 through IL3 that emit different lights. For example, the intermediate layer IL may include the first intermediate layer IL1 that emits light of a first color, the second intermediate layer IL2 that emits light of a third color, and the third intermediate layer IL3 that emits light of a second color. The first intermediate layer IL1, the second intermediate layer IL2, and the third intermediate layer IL3 may be sequentially stacked.

The first intermediate layer IL1 may have a structure in which a first hole transport layer, a first organic light emitting layer emitting light of the first color, and a first electron transport layer are sequentially stacked. The second intermediate layer IL2 may have a structure in which a second hole transport layer, a second organic light emitting layer emitting light of the third color, and a second electron transport layer are sequentially stacked. The third intermediate layer IL3 may have a structure in which a third hole transport layer, a third organic light emitting layer emitting light of the second color, and a third electron transport layer are sequentially stacked.

The intermediate layer IL may cover the first electrode AND in each opening of the pixel defining layer PDL and cover the pixel defining layer PDL between neighboring subpixels SP1 through SP3, but a portion of the intermediate layer IL may be disconnected.

In one or more embodiments, because the intermediate layer IL is disconnected between adjacent subpixels SP1 through SP3, it is possible to prevent leakage current and color interference between the adjacent subpixels SP1 through SP3. The color interference refers to a phenomenon in which, for example, while a blue subpixel emits blue light, a red subpixel adjacent to the blue subpixel is unintentionally turned on. The color interference occurs due to the leakage current and may occur when the blue subpixel and the red subpixel having a large difference in pixel driving voltage are adjacent to each other. For example, the leakage current refers to a phenomenon in which while a driving current is supplied to the light emitting element of the blue subpixel to turn on the blue subpixel, a portion of the driving current is transmitted to the red subpixel through at least some conductive layers of the intermediate layer IL. If the leakage current occurs, the red subpixel may be unintentionally turned on while the blue subpixel is turned on.

The number of intermediate layers IL1 through IL3 emitting different lights is not limited to that shown in FIG. 5. For example, the intermediate layer IL may include two intermediate layers. In this case, one of the two intermediate layers may be substantially the same as the first intermediate layer IL1, and the other one may include a second hole transport layer, a second organic light emitting layer, a third organic light emitting layer, and a second electron transport layer. In this case, a charge generation layer may be disposed between the two intermediate layers to supply electrons to any one of the two intermediate layers and to supply charges to the other intermediate layer.

In FIG. 5, the first through third intermediate layers IL1 through IL3 are disposed in all of the first emission area EA1, the second emission area EA2, and the third emission area EA3. However, the present disclosure is not limited thereto. For example, the first intermediate layer IL1 may be disposed in the first emission area EA1 and may not be disposed in the second emission area EA2 and the third emission area EA3. In addition, the second intermediate layer IL2 may be disposed in the second emission area EA2 and may not be disposed in the first emission area EA1 and the third emission area EA3. In addition, the third intermediate layer IL3 may be disposed in the third emission area EA3 and may not be disposed in the first emission area EA1 and the second emission area EA2. In this case, first through third color filters CF1 through CF3 of the optical layer OPL may be omitted.

The second electrode CAT may be disposed on the third intermediate layer IL3. The second electrode CAT may be disposed on the third intermediate layer IL3 in each of the first through third subpixels SP1 to SP3. The second electrode CAT may be made of a transparent conductive material (TCO) that can transmit light, such as indium tin oxide (ITO) and/or indium zinc oxide (IZO), and/or a semi-transmissive conductive material such as magnesium (Mg), silver (Ag), and/or an alloy of Mg and Ag. When the second electrode CAT is made of a semi-transmissive conductive material, the light output efficiency of each of the first through third subpixels SP1 through SP3 may be increased by a microcavity.

The encapsulation layer TFE may be disposed on the light emitting element layer EML. The encapsulation layer TFE may include one or more inorganic layers TFE1 and TFE3 to prevent the penetration of oxygen or moisture into the light emitting element layer EML. In addition, the encapsulation layer TFE may include at least one organic layer to protect the light emitting element layer EML from foreign substances such as dust. For example, the encapsulation layer TFE may include a first encapsulating inorganic layer TFE1, an encapsulating organic layer TFE2, and a second encapsulating inorganic layer TFE3.

The first encapsulating inorganic layer TFE1 may be disposed on the second electrode CAT, the encapsulating organic layer TFE2 may be disposed on the first encapsulating inorganic layer TFE1, and the second encapsulating inorganic layer TFE3 may be disposed on the encapsulating organic layer TFE2. Each of the first encapsulating inorganic layer TFE1 and the second encapsulating inorganic layer TFE3 may be a multilayer in which one or more inorganic layers selected from silicon nitride (SiNx), silicon oxynitride (SiON), silicon oxide (SiOx), titanium oxide (TiOx), and/or aluminum oxide (AlOx) layers are alternately stacked. The encapsulating organic layer TFE2 may be a monomer. Alternatively, the encapsulating organic layer TFE2 may be an organic layer such as acryl resin, epoxy resin, phenolic resin, polyamide resin, and/or polyimide resin.

An adhesive layer ADL may be a layer for bonding the encapsulation layer TFE and the optical layer OPL together. The adhesive layer ADL may be a double-sided adhesive member. In addition, the adhesive layer ADL may be a transparent adhesive member such as a transparent adhesive and/or a transparent adhesive resin.

The optical layer OPL includes a plurality of color filters CF1 through CF3, a plurality of lenses LNS, and a filling layer FIL. The color filters CF1 through CF3 may include the first through third color filters CF1 through CF3. The first through third color filters CF1 through CF3 may be disposed on the adhesive layer ADL.

The first color filter CF1 may overlap the first emission area EA1 of the first subpixel SP1. The first color filter CF1 may transmit light of the first color, that is, light in a blue wavelength band. The blue wavelength band may be about 370 to 460 nm. Therefore, the first color filter CF1 can transmit the light of the first color from among the light emitted from the first emission area EA1.

The second color filter CF2 may overlap the second emission area EA2 of the second subpixel SP2. The second color filter CF2 may transmit light of the second color, that is, light in a green wavelength band. The green wavelength band may be about 480 to 560 nm. Therefore, the second color filter CF2 can transmit the light of the second color from among the light emitted from the second emission area EA2.

The third color filter CF3 may overlap the third emission area EA3 of the third subpixel SP3. The third color filter CF3 may transmit light of the third color, that is, light in a red wavelength band. The red wavelength band may be about 600 to 750 nm. Therefore, the third color filter CF3 can transmit the light of the third color from among the light emitted from the third emission area EA3.

The lenses LNS may be disposed on the first color filter CF1, the second color filter CF2, and the third color filter CF3, respectively. Each of the lenses LNS may be a structure for increasing the ratio of light directed to the front of the display device 10. Each of the lenses LNS may have an upwardly convex cross-sectional shape.

The filling layer FIL may be disposed on the lenses LNS. The filling layer FIL may have a desired refractive index (e.g., a predetermined refractive index) so that light can travel in the third direction DR3 at an interface between the lenses LNS and the filling layer FIL. In addition, the filling layer FIL may be a planarization layer. The filling layer FIL may be an organic layer such as acryl resin, epoxy resin, phenolic resin, polyamide resin, and/or polyimide resin.

The cover layer CVL may be disposed on the filling layer FIL. The cover layer CVL may be a glass substrate or a polymer resin such as resin. When the cover layer CVL is a glass substrate, it may be attached onto the filling layer FIL. In this case, the filling layer FIL may serve to bond the cover layer CVL. When the cover layer CVL is a glass substrate, it may serve as an encapsulation substrate. When the cover layer CVL is a polymer resin such as resin, it may be directly applied on the filling layer FIL.

The polarizer may be disposed on a surface of the cover layer CVL. The polarizer may be a structure for preventing visibility reduction due to the reflection of external light. The polarizer may include a linear polarizer and a phase retardation film. For example, the phase retardation film may be a quarter-wave plate (λ/4 plate), but the present disclosure is not limited thereto. If visibility due to the reflection of external light is sufficiently improved by the first through third color filters CF1 through CF3, the polarizer may be omitted.

Figure 6:
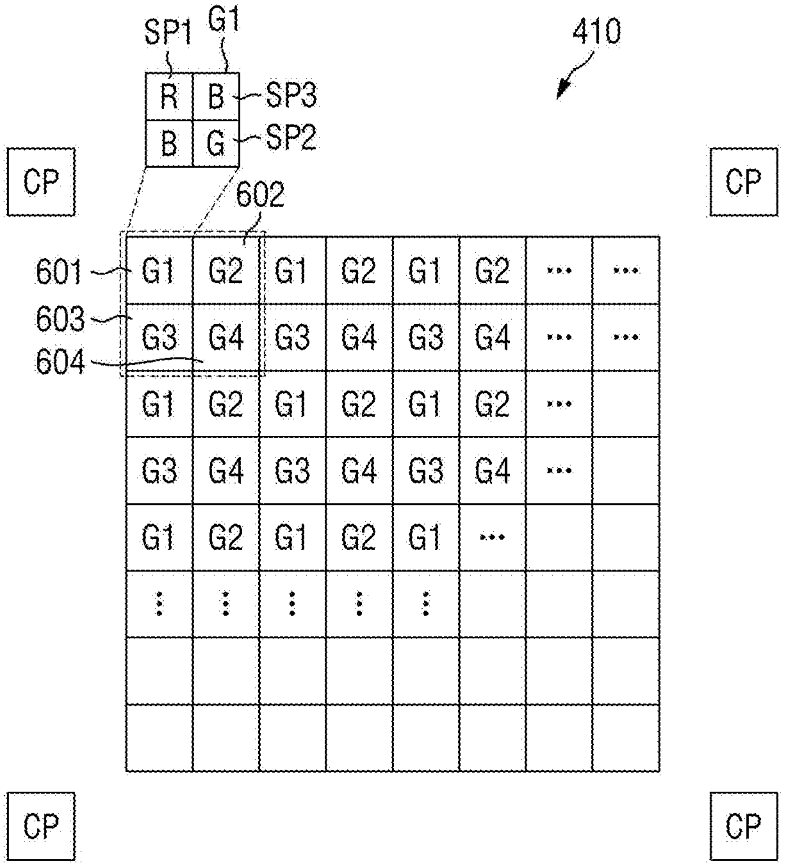
FIG. 6 is a layout view illustrating a plurality of pixels and correction pixels included in the display panel according to one or more embodiments.

FIG. 6 is a layout view illustrating a plurality of pixels G1 through G4 and correction pixels CP included in the display panel 410 according to the embodiment.

Referring to FIG. 6, the display panel 410 according to the embodiment has a plurality of pixels G1 through G4 arranged in a matrix form. The display panel 410 according to the embodiment includes one or more correction pixels CP in addition to the pixels G1 through G4. The correction pixels CP may be disposed on the periphery of the display panel 410. The correction pixels CP are dummy pixels used in an inspection process for measuring the luminance uniformity of the display panel 410. The correction pixels CP are pixels that are constantly turned on during the inspection process for measuring the luminance uniformity of the display panel 410. Because the correction pixels CP are always on, they are used as an indicator that reflects the aging characteristics of the display panel 410.

According to one or more embodiments, the pixels G1 through G4 are divided into a first group G1, a second group G2, a third group G3, and a fourth group G4. The pixels G1 through G4 may be divided into the first group G1, the second group G2, the third group G3, and the fourth group G4 in units of 2*2 pixels disposed adjacent to each other. Here, the symbol * indicates a multiplication sign.

First pixels included in the first group G1 from among the pixels G1 through G4 are pixels disposed in a first row and first column 601 from among 2*2 pixels disposed adjacent to each other. For example, the first pixels included in the first group G1 in odd-numbered rows of the pixels G1 through G4 are disposed at intervals along a row direction (i.e., a horizontal direction).

Second pixels included in the second group G2 from among the pixels G1 through G4 are pixels disposed in a first row and second column 602 from among the 2*2 pixels disposed adjacent to each other. For example, the second pixels included in the second group G2 in the odd-numbered rows of the pixels G1 through G4 are disposed at intervals along the row direction. The second pixels and the first pixels may be alternately arranged in the odd-numbered rows along the row direction.

Third pixels included in the third group G3 from among the pixels G1 through G4 are pixels disposed in a second row and first column 603 from among the 2*2 pixels disposed adjacent to each other. For example, the third pixels included in the third group G3 in even-numbered rows of the pixels G1 through G4 are disposed at intervals along the row direction.

Fourth pixels included in the fourth group G4 from among the pixels G1 through G4 are pixels disposed in a second row and second column 604 among the 2*2 pixels disposed adjacent to each other. For example, the fourth pixels included in the fourth group G4 in the even-numbered rows of the pixels G1 through G4 are disposed at intervals along the row direction. The third pixels and the fourth pixels may be alternately arranged in the even-numbered rows along the row direction.

According to one or more embodiments, each of the first group G1, the second group G2, the third group G3, and the fourth group G4 may include a plurality of subpixels SP1 through SP3.

According to one or more embodiments, each of the correction pixels CP may include a plurality of subpixels SP1 through SP3.

According to one or more embodiments, each of the first group G1, the second group G2, the third group G3, and the fourth group G4 may have the same configuration as each of the correction pixels CP. For example, each of the first group G1, the second group G2, the third group G3, and the fourth group G4 includes four subpixels SP1 through SP3, and each of the correction pixels CP includes four subpixels SP1 through SP3.

Although the pixels G1 through G4 are divided into the first group G1, the second group G2, the third group G3, and the fourth group G4 in the present disclosure, this is only an example, and the present disclosure is not limited thereto. For example, the pixels G1 through G4 can be in any form as long as they are divided into a plurality of groups.

Figure 7:
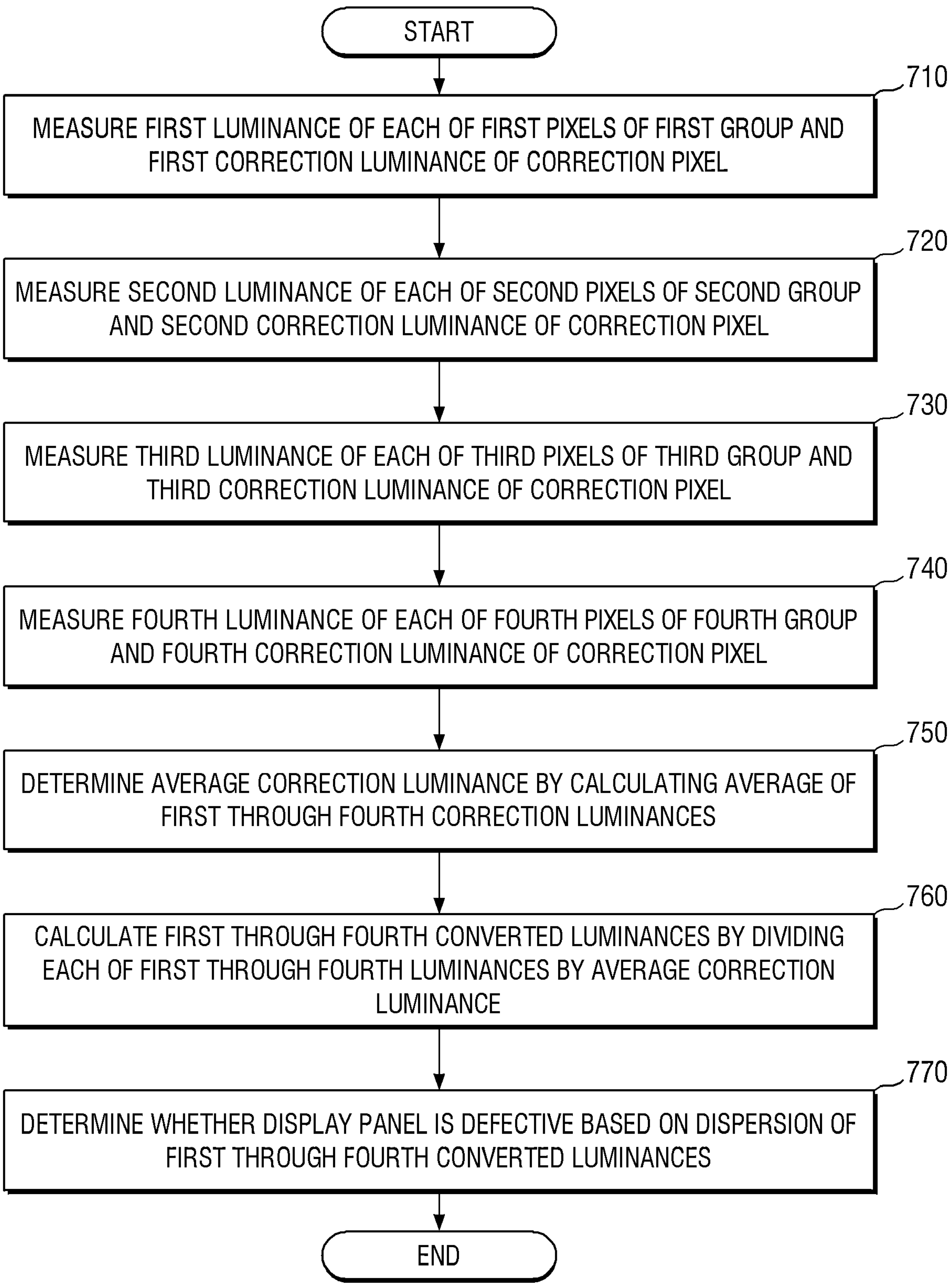
FIG. 7 is a flowchart illustrating a method of inspecting a display panel according to one or more embodiments.
Figure 8:
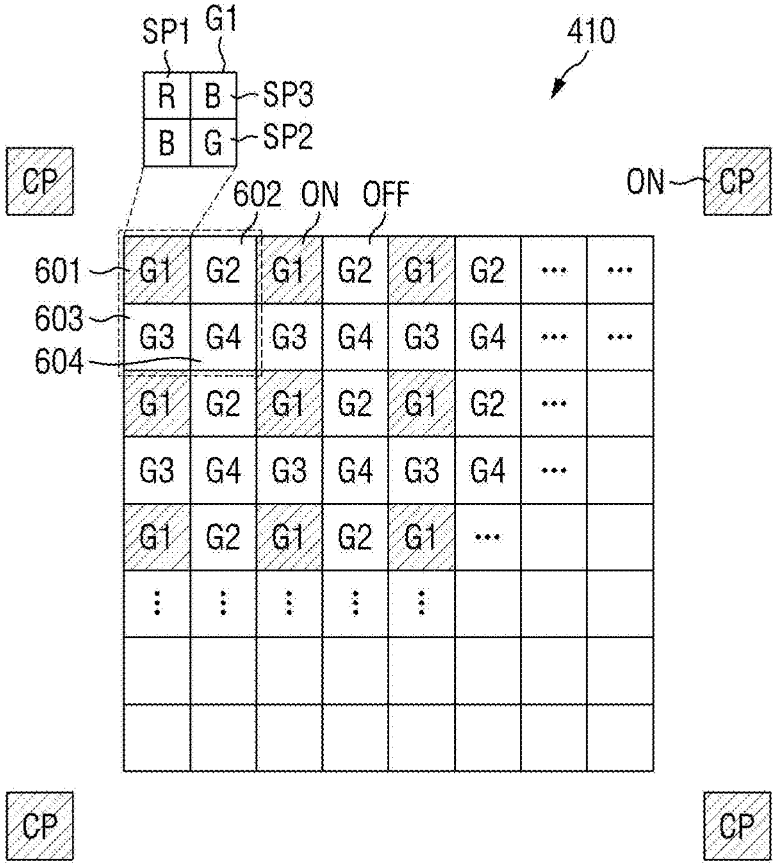
FIG. 8 is a plan view of the display panel, illustrating a period during which first pixels in a first group are turned on according to one or more embodiments.
Figure 9:
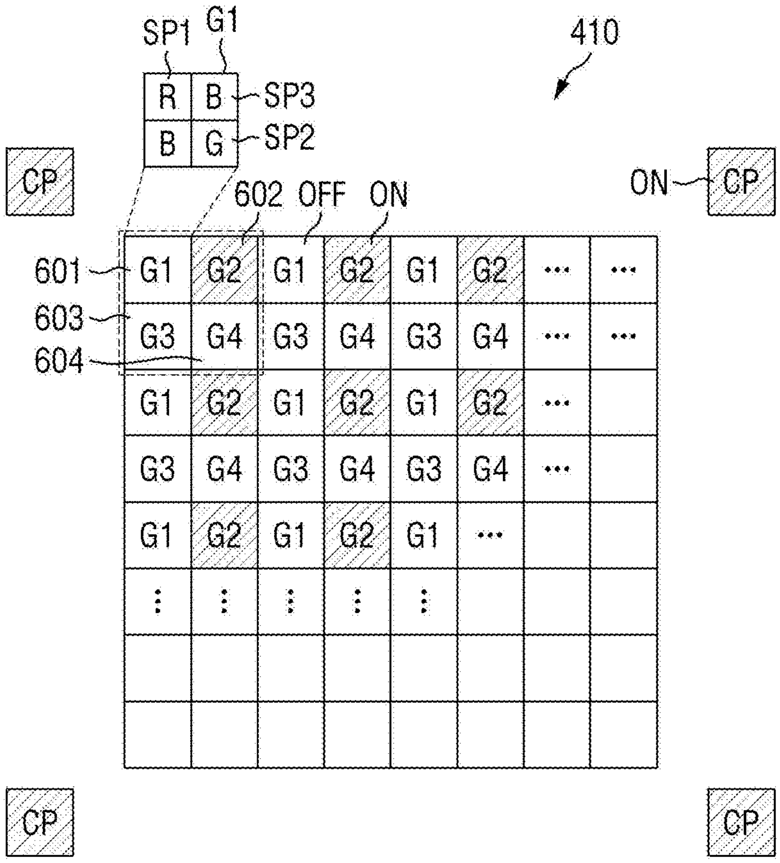
FIG. 9 is a plan view of the display panel, illustrating a period during which second pixels in a second group are turned on according to one or more embodiments.
Figure 10:
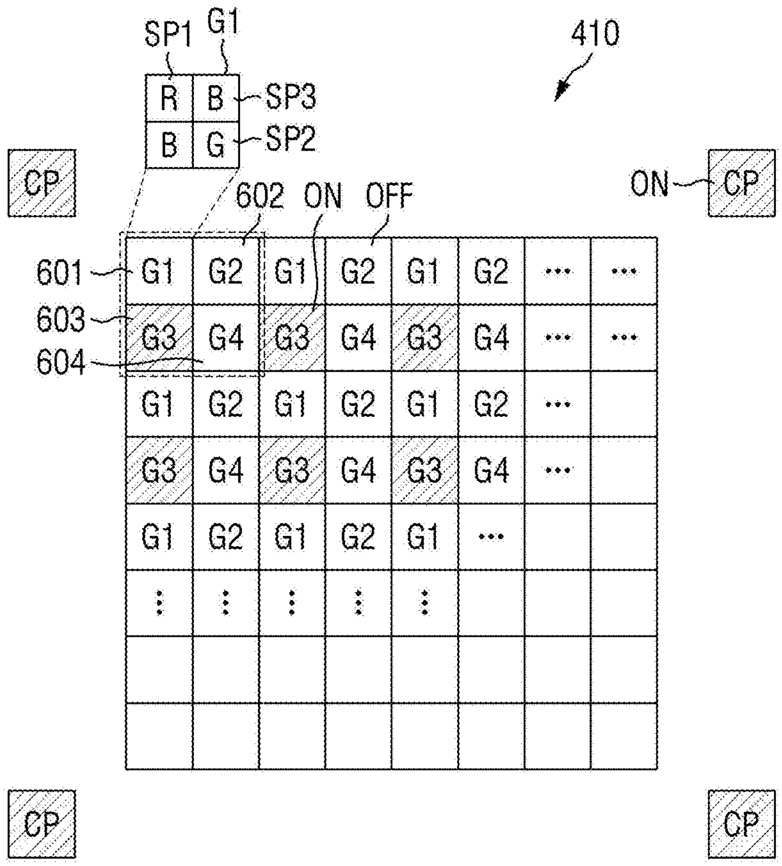
FIG. 10 is a plan view of the display panel, illustrating a period during which third pixels in a third group are turned on according to one or more embodiments.
Figure 11:
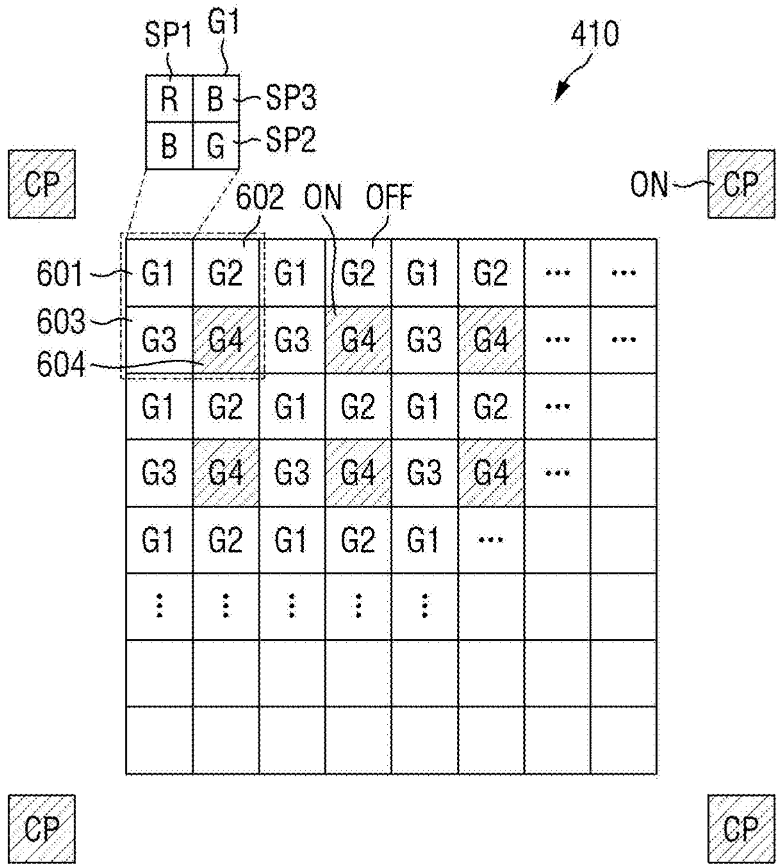
FIG. 11 is a plan view of the display panel, illustrating a period during which fourth pixels in a fourth group are turned on according to one or more embodiments.

FIG. 7 is a flowchart illustrating a method of inspecting a display panel 410 according to one or more embodiments. FIG. 8 is a plan view of the display panel 410, illustrating a period (hereinafter, referred to as a first shot period) during which first pixels in a first group G1 are turned on according to one or more embodiments. FIG. 9 is a plan view of the display panel 410, illustrating a period (hereinafter, referred to as a second shot period) during which second pixels in a second group G2 are turned on according to one or more embodiments. FIG. 10 is a plan view of the display panel 410, illustrating a period (hereinafter, referred to as a third shot period) during which third pixels in a third group G3 are turned on according to one or more embodiments. FIG. 11 is a plan view of the display panel 410, illustrating a period (hereinafter, referred to as a fourth shot period) during which fourth pixels in a fourth group G4 are turned on according to one or more embodiments.

The method of inspecting the display panel 410 according to one or more embodiments will now be described with reference to FIGS. 7 through 11.

Referring to FIGS. 7 and 8, in operation 710, first luminance of each of the first pixels of the first group G1 and first correction luminance of a correction pixel CP are measured. For example, while the first group G1 from among a plurality of pixels G1 through G4 included in the display panel 410 and the correction pixel CP are turned on, the first luminance of each of the first pixels included in the first group G1 is measured, and the first correction luminance of the correction pixel CP is measured.

In operation 710, the first luminance is measured for each of the first pixels. The first luminance measured for each of the first pixels may be measured as a nit value indicating the degree of brightness per unit area, as shown in a second row of Table 1.

While the first group G1 and the correction pixel CP are turned on, the pixels of the second through fourth groups G2 through G4 remain turned off.

The correction pixel CP includes a plurality of correction pixels CP disposed adjacent to each other. For example, while the first pixels of the first group G1 are turned on, the correction pixels CP may be turned on. The correction pixels CP are set such that they are constantly turned on while the pixels of the first through fourth groups G1 through G4 are sequentially turned on in a subsequent inspection process.

Because the correction pixels CP are always on, the luminances of the correction pixels CP reflect the aging characteristics of the display panel 410.

Referring to FIGS. 7 and 9, in operation 720, second luminance of each of the second pixels of the second group G2 and second correction luminance of the correction pixel CP are measured. For example, while the second group G2 from among the pixels G1 through G4 and the correction pixel CP are turned on, the second luminance of each of the second pixels included in the second group G2 is measured, and the second correction luminance of the correction pixel CP is measured.

In operation 720, the second luminance is measured for each of the second pixels. The second luminance measured for each of the second pixels may be measured as a nit value indicating the degree of brightness per unit area, as shown in a third row of Table 1.

While the second group G2 and the correction pixel CP are turned on, the pixels of the first group G1, the third group G3 and the fourth group G4 remain turned off.

Referring to FIGS. 7 and 10, in operation 730, third luminance of each of the third pixels of the third group G3 and third correction luminance of the correction pixel CP are measured. For example, while the third group G3 from among the pixels G1 through G4 and the correction pixel CP are turned on, the third luminance of each of the third pixels included in the third group G3 is measured, and the third correction luminance of the correction pixel CP is measured.

In operation 730, the third luminance is measured for each of the third pixels. The third luminance measured for each of the third pixels may be measured as a nit value indicating the degree of brightness per unit area, as shown in a fourth row of Table 1.

While the third group G3 and the correction pixel CP are turned on, the pixels of the first group G1, the second group G2 and the fourth group G4 remain turned off.

Referring to FIGS. 7 and 11, in operation 740, fourth luminance of each of the fourth pixels of the fourth group G4 and fourth correction luminance of the correction pixel CP are measured. For example, while the fourth group G4 from among the pixels G1 through G4 and the correction pixel CP are turned on, the fourth luminance of each of the fourth pixels included in the fourth group G4 is measured, and the fourth correction luminance of the correction pixel OP is measured.

In operation 740, the fourth luminance is measured for each of the fourth pixels. The fourth luminance measured for each of the fourth pixels may be measured as a nit value indicating the degree of brightness per unit area, as shown in a fifth row of Table 1.

While the fourth group G4 and the correction pixel OP are turned on, the pixels of the first through third groups G3 remain turned off.

TABLE 1

| | #1 | #2 | #3 | #4 | #5 | #6 | #7 | #8 | #9 | #10 |
|---|---|---|---|---|---|---|---|---|---|---|
| Shot#1 | 677.5 | 670.5 | 719.0 | 671.2 | 731.8 | 665.9 | 639.4 | 668.4 | 653.8 | 706.2 |
| Shot#2 | 692.2 | 628.4 | 698.6 | 667.0 | 730.1 | 665.5 | 704.5 | 601.4 | 656.0 | 686.0 |
| Shot#3 | 708.0 | 698.8 | 715.0 | 726.5 | 710.1 | 712.2 | 738.1 | 730.4 | 647.0 | 735.5 |
| Shot#4 | 727.3 | 679.5 | 701.4 | 611.7 | 677.7 | 676.2 | 762.8 | 673.3 | 647.0 | 678.9 |

Referring to FIG. 7, in operation 750, average correction luminance is determined by calculating the average of the first through fourth correction luminances.

TABLE 2

| | #1 | #2 | #3 | #4 | Avg. |
|---|---|---|---|---|---|
| Shot#1 | 648.0 | 653.9 | 687.7 | 653.3 | 666.7 |
| Shot#2 | 609.1 | 692.4 | 651.1 | 689.7 | 660.6 |
| Shot#3 | 672.6 | 682.0 | 666.3 | 627.8 | 662.2 |
| Shot#4 | 627.6 | 712.4 | 629.0 | 666.7 | 658.9 |

Table 2 is a table showing luminances measured from a plurality of correction pixels CP. Table 2 is based on the assumption that the total number of correction pixels CP is four.

In Table 2, a second column shows luminance values measured from a first correction pixel CP from among the correction pixels CP.

In Table 2, a third column shows luminance values measured from a second correction pixel CP from among the correction pixels CP.

In Table 2, a fourth column shows luminance values measured from a third correction pixel CP from among the correction pixels CP.

In Table 2, a fifth column shows luminance values measured from a fourth correction pixel CP from among the correction pixels CP.

In Table 2, a sixth column shows the average of luminance values measured from each of the correction pixels CP.

In Table 2, a second row shows first correction luminance values measured by the correction pixels CP during the first shot period during which the first pixels of the first group G1 are turned on.

In Table 2, a third row shows second correction luminance values measured by the correction pixels CP during the second shot period during which the second pixels of the second group G2 are turned on.

In Table 2, a fourth row shows third correction luminance values measured by the correction pixels CP during the third shot period during which the third pixels of the third group G3 are turned on.

In Table 2, a fifth row shows fourth correction luminance values measured by the correction pixels CP during the fourth shot period during which the fourth pixels of the fourth group G4 are turned on.

Although the total number of correction pixels CP is four in Table 2, this is only an example, and the present disclosure is not limited thereto.

Referring to FIG. 7, in operation 760, first through fourth converted luminances are calculated by dividing each of the first through fourth luminances by the average correction luminance (or the average of luminance values measured from each of the correction pixels CP). Equations for calculating the first through fourth converted luminances may be Equations 1 through 4.

$$\text{First converted luminance of each first pixel} = \text{first luminance of each first pixel} \div \text{average value of first correction luminance.} \quad (1)$$

Referring to Equation 1, the first converted luminance can be calculated by dividing a luminance value measured from each of the first pixels by about 666.7 nits which is the average correction luminance. For example, as shown in Table 1, the luminance of a first pixel corresponding to #1 during the first shot period may be measured as about 677.5 nits, and this value is divided by about 666.7 nits which is the average correction luminance. The result is the first converted luminance corresponding to about 1.025.

$$\text{Second converted luminance of each second pixel} = \text{second luminance of each second pixel} \div \text{average value of second correction luminance.} \quad (2)$$

Referring to Equation 2, the second converted luminance can be calculated by dividing a luminance value measured from each of the second pixels by about 660.6 nits which is the average correction luminance. For example, as shown in Table 1, the luminance of a second pixel corresponding to #1 during the second shot period may be measured as about 692.2 nits, and this value is divided by about 660.6 nits which is the average correction luminance. The result is the second converted luminance corresponding to about 1.047.

$$\text{Third converted luminance of each third pixel} = \text{third luminance of each third pixel} \div \text{average value of third correction luminance.} \quad (3)$$

Referring to Equation 3, the third converted luminance can be calculated by dividing a luminance value measured from each of the third pixels by about 662.2 nits which is the average correction luminance. For example, as shown in Table 1, the luminance of a third pixel corresponding to #1 during the third shot period may be measured as about 708.0 nits, and this value is divided by about 662.2 nits which is the average correction luminance. The result is the third converted luminance corresponding to about 1.069.

$$\text{Fourth converted luminance of each fourth pixel} = \text{fourth luminance of each fourth pixel} \div \text{average value of fourth correction luminance.} \quad (4)$$

Referring to Equation 4, the fourth converted luminance can be calculated by dividing a luminance value measured from each of the fourth pixels by about 658.9 nits which is the average correction luminance. For example, as shown in Table 1, the luminance of a fourth pixel corresponding to #1 during the fourth shot period may be measured as about 727.3 nits, and this value is divided by about 658.9 nits which is the average correction luminance. The result is the fourth converted luminance corresponding to about 1.103.

If the average of the first to fourth converted luminances is converted to 100%, the first to fourth converted luminances can be expressed as Table 3.

TABLE 3

| | #1 | #2 | #3 | #4 | #5 | #6 | #7 | #8 | #9 | #10 |
|---|---|---|---|---|---|---|---|---|---|---|
| Shot#1 | 98.3% | 97.3% | 104.3% | 97.4% | 106.2% | 96.6% | 92.8% | 97.0% | 94.9% | 102.5% |
| Shot#2 | 100.4% | 91.2% | 101.4% | 96.8% | 105.9% | 96.6% | 102.2% | 87.3% | 95.2% | 99.5% |
| Shot#3 | 102.5% | 99.9% | 103.5% | 105.2% | 102.8% | 103.1% | 106.9% | 105.7% | 93.7% | 109.1% |
| Shot#4 | 105.8% | 98.9% | 102.0% | 89.0% | 98.6% | 98.4% | 111.0% | 97.9% | 94.1% | 98.8% |

As shown in Table 3, the luminance measured for each shot period and for each pixel may be corrected and expressed in percentage form.

Referring to FIG. 7, in operation 770, it is determined whether the display panel 410 is defective based on the dispersion of the first through fourth converted luminances. For example, a luminance evaluation table such as Table 3 is produced, and it is determined how much the luminances of the pixels are dispersed from the average based on the table. For example, if the dispersion deviates from an average value (e.g., 100%) by about 2%, it may be determined that the display panel 410 is defective.

Figure 12:
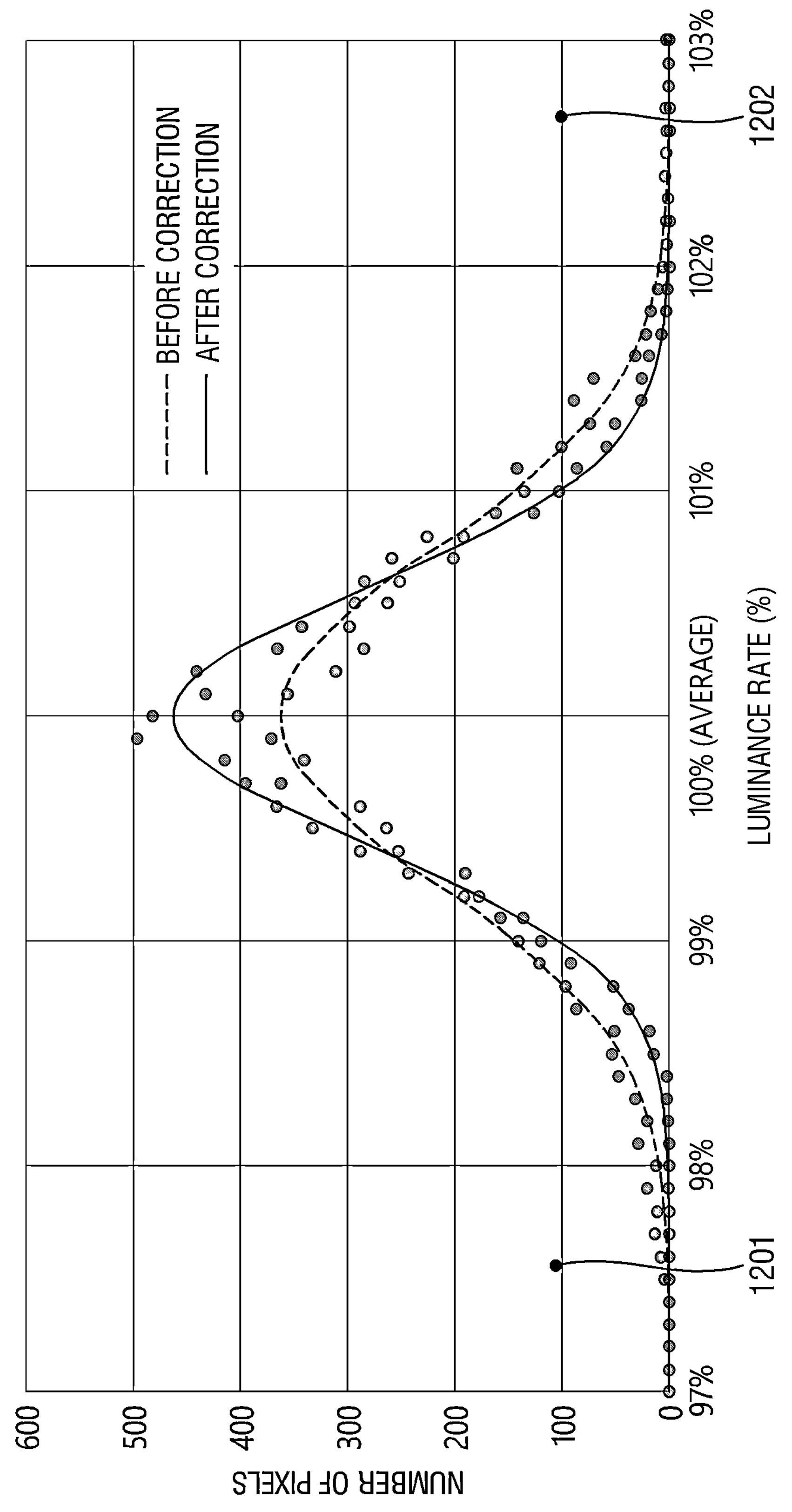
FIG. 12 is a scatter graph illustrating the measured luminance uniformity of pixels of a display panel according to one or more embodiments.

FIG. 12 is a scatter graph illustrating the measured luminance uniformity of pixels of a display panel 410 according to one or more embodiments.

In FIG. 12, the horizontal axis is luminance rate, and the unit is percent. In FIG. 12, the vertical axis is the number of pixels. In FIG. 12, the center corresponding to 100% corresponds to the overall average.

In FIG. 12, a dotted line is a graph representing the dispersion of measured pixel luminance values before correction according to the present disclosure.

In FIG. 12, a solid line is a graph representing the dispersion of the measured pixel luminance values after correction according to the present disclosure.

Referring to FIG. 12, as a result of converting luminance measured from each pixel based on a correction luminance using an inspection method according to one or more embodiments, it can be identified that a luminance value measured each time from the same pixel is close to the average, and thus the dispersion is reduced.

As a result of measuring luminance according to one or more embodiments, if the dispersion of luminances deviates from an average value by about 2%, the display panel 410 may be determined to be defective. For example, if the dispersion of the luminances deviates from the average value by about 2% as indicated by points 1201 and 1202 of FIG. 12, the display panel 410 may be determined to be defective.

In concluding the detailed description, those skilled in the art will appreciate that many variations and modifications can be made to the embodiments without substantially departing from the principles and scope of the present disclosure. Therefore, the embodiments of the present disclosure are used in a generic and descriptive sense only and not for purposes of limitation.

What is claimed is:

1. A method of inspecting a display panel, the method comprising:

measuring first luminance of each of first pixels included in a first group and measuring first correction luminance of a correction pixel while the first group from among a plurality of pixels included in the display panel and the correction pixel are turned on;

measuring second luminance of each of second pixels included in a second group and measuring second correction luminance of the correction pixel while the second group from among the plurality of pixels and the correction pixel are turned on;

measuring third luminance of each of third pixels included in a third group and measuring third correction luminance of the correction pixel while the third group from among the plurality of pixels and the correction pixel are turned on;

measuring fourth luminance of each of fourth pixels included in a fourth group and measuring fourth correction luminance of the correction pixel while the fourth group from among the plurality of pixels and the correction pixel are turned on;

determining average correction luminance by calculating an average of the first through fourth correction luminances;

calculating first through fourth converted luminances by dividing each of the first through fourth luminances by the average correction luminance; and determining whether the display panel is defective based on dispersion of the first through fourth converted luminances from an overall average value of luminance of the plurality of pixels.

2. The method of claim 1, wherein the first pixels included in the first group from among the plurality of pixels are located in a first row and first column from among 2*2 pixels located adjacent to each other, the second pixels included in the second group from among the plurality of pixels are located in the first row and a second column from among the 2*2 pixels located adjacent to each other, the third pixels included in the third group from among the plurality of pixels are located in a second row and the first column from among the 2*2 pixels located adjacent to each other, and the fourth pixels included in the fourth group from among the plurality of pixels are pixels located in the second row and the second column from among the 2*2 pixels located adjacent to each other.

3. The method of claim 1, wherein while the first group and the correction pixel are turned on, the pixels of the second through fourth groups remain turned off.

4. The method of claim 1, wherein while the second group and the correction pixel are turned on, the pixels of the first group, the third group, and the fourth group remain turned off.

5. The method of claim 1, wherein while the third group and the correction pixel are turned on, the pixels of the first group, the second group, and the fourth group remain turned off.

6. The method of claim 1, wherein while the fourth group and the correction pixel are turned on, the pixels of the first through third groups remain turned off.

7. The method of claim 1, wherein the correction pixel is on a periphery of the display panel.

8. The method of claim 1, wherein the correction pixel comprises a plurality of correction pixels adjacent to each other.

9. The method of claim 8, further comprising constantly turning on the correction pixels while the pixels of the first through fourth groups are sequentially turned on.

10. The method of claim 1, further comprising determining that the display panel is defective if the dispersion deviates from the overall average value of luminance of the plurality of pixels by about 2%.

11. A method of inspecting a display panel, the method comprising:

measuring first luminance of each of first pixels included in a first group and measuring first correction luminance of a correction pixel while the first group from among a plurality of pixels included in the display panel and the correction pixel are turned on;

measuring second luminance of each of second pixels included in a second group and measuring second correction luminance of the correction pixel while the second group from among the plurality of pixels and the correction pixel are turned on;

measuring third luminance of each of third pixels included in a third group and measuring third correction luminance of the correction pixel while the third group from among the plurality of pixels and the correction pixel are turned on;

measuring fourth luminance of each of fourth pixels included in a fourth group and measuring fourth correction luminance of the correction pixel while the fourth group from among the plurality of pixels and the correction pixel are turned on;

determining average correction luminance by calculating an average of the first through fourth correction luminances;

calculating first through fourth converted luminances by dividing each of the first through fourth luminances by the average correction luminance; and determining whether the display panel is defective based on dispersion of the first through fourth converted luminances from an overall average value of luminance of the plurality of pixels.

12. The method of claim 11, wherein the first pixels included in the first group from among the plurality of pixels are pixels in a first row and a first column from among 2*2 pixels located adjacent to each other, the second pixels included in the second group from among the plurality of pixels are pixels-in the first row and a second column from among the 2*2 pixels located adjacent to each other, the third pixels included in the third group from among the pixels are pixels-in a second row and the first column from among the 2*2 pixels located adjacent to each other, and the fourth pixels included in the fourth group from among the pixels are pixels in the second row and the second column from among the 2*2 pixels located adjacent to each other.

13. The method of claim 11, wherein while the first group and the correction pixel are turned on, the pixels of the second through fourth groups remain turned off.

14. The method of claim 11, wherein while the second group and the correction pixel are turned on, the pixels of the first group, the third group, and the fourth group remain turned off.

15. The method of claim 11, wherein while the third group and the correction pixel are turned on, the pixels of the first group, the second group, and the fourth group remain turned off.

16. The method of claim 11, wherein while the fourth group and the correction pixel are turned on, the pixels of the first through third groups remain turned off.

17. The method of claim 11, wherein the correction pixel is on a periphery of the display panel.

18. The method of claim 11, wherein the correction pixel comprises a plurality of correction pixels adjacent to each other.

19. The method of claim 18, further comprising constantly turning on the correction pixels while the pixels of the first through fourth groups are sequentially turned on.

20. The method of claim 11, further comprising determining that the display panel is defective if the dispersion deviates from the overall average value of luminance of the plurality of pixels by about 2%.

* * * * *